(12) United States Patent
Choi et al.

(10) Patent No.: US 12,024,626 B2
(45) Date of Patent: Jul. 2, 2024

(54) THERMOPLASTIC COPOLYMER COMPOSITION AND MOLDED ARTICLE MANUFACTURED USING THE SAME

(71) Applicant: LG CHEM, LTD., Seoul (KR)

(72) Inventors: Sung Moon Choi, Daejeon (KR); Hyung Min Ahn, Daejeon (KR); Kyu Young Kim, Daejeon (KR); Moo Song Seo, Daejeon (KR); Jung Woo Kim, Daejeon (KR); Min Han Kwak, Daejeon (KR); Dae Chul Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 718 days.

(21) Appl. No.: 17/267,706

(22) PCT Filed: Aug. 3, 2020

(86) PCT No.: PCT/KR2020/010230
§ 371 (c)(1),
(2) Date: Feb. 10, 2021

(87) PCT Pub. No.: WO2021/029589
PCT Pub. Date: Feb. 18, 2021

(65) Prior Publication Data
US 2021/0189116 A1    Jun. 24, 2021

(30) Foreign Application Priority Data

Aug. 14, 2019  (KR) .......... 10-2019-0099672
Jul. 30, 2020  (KR) .......... 10-2020-0095350

(51) Int. Cl.
*C08L 67/02*    (2006.01)

(52) U.S. Cl.
CPC ......... *C08L 67/02* (2013.01); *C08L 2205/035* (2013.01)

(58) Field of Classification Search
CPC ..................... C08L 67/02; C08L 2205/035
(Continued)

(56) References Cited

U.S. PATENT DOCUMENTS 5,502,095 A    3/1996  Ueshima et al.
5,902,854 A    5/1999  Kelley et al.
(Continued)

FOREIGN PATENT DOCUMENTS

EP    2186860 A1    5/2010
JP    H6329888 A    11/1994
(Continued)

*Primary Examiner* — Ling Siu Cho
*Assistant Examiner* — Ronald Grinsted
(74) *Attorney, Agent, or Firm* — Bryan Cave Leighton Paisner LLP

(57) ABSTRACT

The present disclosure provides a thermoplastic copolymer composition capable of improving low noise properties without deterioration in mechanical properties, which is used in manufacture of a molded article, such as a constant velocity joint boot used as a component of an automobile. The composition includes a polyester elastomer; additives including silica and a siloxane-based polymer represented by Chemical Formula 1; and polytetramethylene glycol, where the additives are included in an amount of 1 to 4 parts by weight based on 100 parts by weight of the polyester elastomer

15 Claims, 1 Drawing Sheet

(58) Field of Classification Search
USPC .......................................................... 524/539
See application file for complete search history.

(56) References Cited

U.S. PATENT DOCUMENTS

| | | | |
|---|---|---|---|
| 2004/0041355 A1* | 3/2004 | Suzuki | B65D 53/02 |
| | | | 277/650 |
| 2006/0142422 A1* | 6/2006 | Kobayashi | C08K 3/01 |
| | | | 523/209 |

FOREIGN PATENT DOCUMENTS

| | | | |
|---|---|---|---|
| JP | 9-177971 A | 7/1997 |
| JP | 1998-152604 A | 6/1998 |
| JP | H11130952 A | 5/1999 |
| JP | 2000159991 A | 6/2000 |
| JP | 2001-040198 A | 2/2001 |
| JP | 2003-509522 A | 3/2003 |
| JP | 2003118776 A | 4/2003 |
| JP | 2005-336427 A | 12/2005 |
| JP | 2008-523216 A | 7/2008 |
| KR | 10-1993-0019733 A | 10/1993 |
| KR | 10-1996-0006155 B1 | 5/1996 |
| KR | 2000-0011725 A | 2/2000 |
| KR | 10-2004-0041532 A | 5/2004 |
| WO | 2010010690 A1 | 1/2010 |
| WO | 2012128161 A1 | 9/2012 |

* cited by examiner

THERMOPLASTIC COPOLYMER COMPOSITION AND MOLDED ARTICLE MANUFACTURED USING THE SAME

CROSS-REFERENCE TO RELATED APPLICATIONS

This application is a National Phase entry pursuant to 35 U.S.C. § 371 of International Application No. PCT/KR2020/0010230, filed on Aug. 3, 2020, and claims priority to and the benefit of Korean Patent Application No. 10-2019-0099672, filed on Aug. 14, 2019, and Korean Patent Application No. 10-2020-0095350, filed on Jul. 30, 2020, with the Korean Intellectual Property Office, the disclosures of which are hereby incorporated by reference in their entirety for all purposes as if fully set forth herein.

TECHNICAL FIELD

The present invention relates to a thermoplastic copolymer composition, and more particularly, to a thermoplastic copolymer composition capable of providing a noise reduction effect, which is used in manufacture of molded articles such as a constant velocity joint boot.

BACKGROUND ART

A constant velocity joint is an automobile component installed between a transmission and tires, and plays a role of uniformly transmitting power generated from an engine to the tires through the transmission so that both tires rotate at a uniform speed.

Such a constant velocity joint is coated with an excess of grease that acts as a lubricant, and the constant velocity joint is wrapped with a rubber boot to prevent the lubricating grease from leaking out. That is, the boot used for the constant velocity joint serves to protect the constant velocity joint and the grease from foreign substances. In general, a boot is manufactured by subjecting rubber or a polyester-based resin to extrusion molding.

Meanwhile, when power is transmitted to tires via a constant velocity joint while the constant velocity joint rotates, noise can occur due to friction between the surfaces of corrugations formed in a boot. At this time, when the lower part of an automobile is contaminated with foreign substances such as water, salt water, or sand, noise due to friction between the surfaces of the corrugations inside the boot can be further increased, generating a loud noise of 90 dB or more. Accordingly, when a boot is manufactured, various lubricants are added to reduce noise.

Amide-, montan-, or olefin-based monomeric wax is commonly used as the lubricant, but these components have poor compatibility with a polyester elastomer which is a major component of a boot. Accordingly, when the wax is added in a small amount, lubrication effect can be insignificant. On the other hand, when the wax is added in an excessive amount, surface defects, deterioration in mechanical properties, or the like can be caused due to a migration phenomenon.

Accordingly, there have been attempts to reduce noise generation due to friction or contamination by adding organic substances such as polyalkylene glycols, but even in this case, noise generation was not effectively reduced.

Therefore, there is a need to develop a material that is capable of effectively reducing noise generation in a constant velocity joint boot.

RELATED ART DOCUMENTS

[Patent Documents] (Patent Document 0001) JP 1997-177971 A

DISCLOSURE

Technical Problem

Therefore, the present invention has been made in view of the above problems, and it is one object of the present invention to improve the surface properties of a constant velocity joint boot in terms of uniformity without deterioration in mechanical properties, thereby effectively improving the noise reduction properties and sound insulation properties of the constant velocity joint boot.

It is another object of the present invention to provide a thermoplastic copolymer composition capable of improving low noise properties without deterioration in mechanical properties, which is used in manufacture of a molded article such as a constant velocity joint boot.

Technical Solution

In accordance with one aspect of the present invention, provided is a thermoplastic copolymer composition including a polyester elastomer; polytetramethylene glycol; and additives including silica ($SiO_2$) and a siloxane-based polymer represented by Chemical Formula 1, wherein the polytetramethylene glycol is included in an amount of 3 to 8 parts by weight based on 100 parts by weight of the polyester elastomer, and the additives are included in an amount of 1 to 4 parts by weight based on 100 parts by weight of the polyester elastomer:

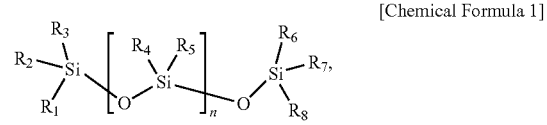

[Chemical Formula 1]

wherein $R_1$ to $R_8$ are each independently an alkyl group having 1 to 10 carbon atoms, and n is an integer from 100 to 10,000.

In accordance with another aspect of the present invention, provided is a molded article manufactured using the thermoplastic copolymer composition.

Advantageous Effects

A thermoplastic copolymer composition according to the present invention includes, as major components, a polyester elastomer and polytetramethylene glycol having excellent compatibility with the elastomer. Accordingly, when a molded article is manufactured using the composition according to the present invention, the soft properties of the molded article can be reinforced, thereby minimizing noise generation due to mechanical friction. In addition, since the composition of the present invention includes additives including silica ($SiO_2$) and a siloxane-based polymer that increase the exudation rate of polytetramethylene glycol, in a molded article such as a constant velocity joint boot, noise due to friction or contamination can be effectively reduced.

Furthermore, since the composition of the present invention further includes a polyalkylene terephthalate, when the composition of the present invention is used to manufacture a molded article, such as a constant velocity joint boot, that particularly requires hardness and tensile strength, the mechanical properties of the molded article can be improved.

BEST MODE

Figure 1:
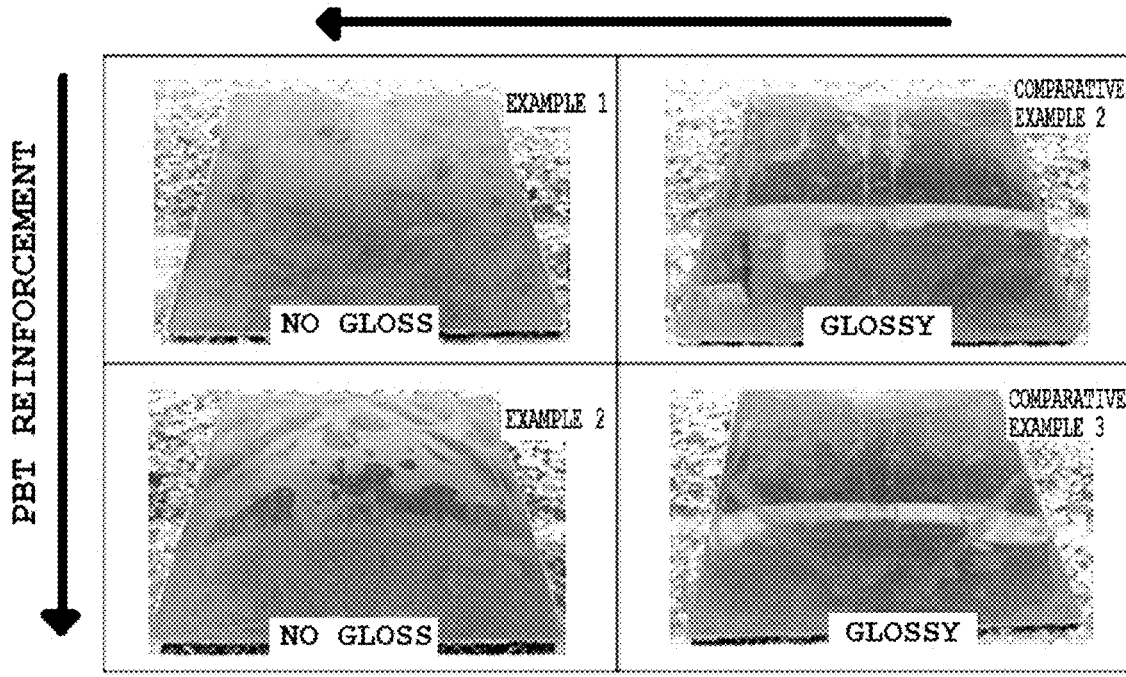
FIG. 1 includes images showing the surface conditions of specimens manufactured using thermoplastic copolymer compositions according to Examples 1 and 2 of the present invention or thermoplastic copolymer compositions according to Comparative Examples 2 and 3 after leaving the specimens for 1 week.

The terms and words which are used in the present specification and the appended claims should not be construed as being confined to common meanings or dictionary meanings but should be construed as having meanings and concepts matching the technical spirit of the present invention in order to describe the present invention in the best fashion.

Hereinafter, the present invention will be described in more detail to aid in understanding of the present invention.

A thermoplastic copolymer composition according to one embodiment of the present invention includes a polyester elastomer (a); polytetramethylene glycol (b); and additives (c) including silica ($SiO_2$) and a siloxane-based polymer.

In the thermoplastic copolymer composition of the present invention, the polyester elastomer (a) has both advantages of thermoplastic resins having excellent moldability and rubber having excellent flexibility and elastic resilience, and thus may be used as a material for the components of an automobile, e.g., a constant velocity joint boot. In the technical field of the present invention, the polyester elastomer (a) may be referred to as a thermoplastic polyester elastomer (TPEE).

The polyester elastomer may be obtained by polycondensing a polyester and a polyether. The polyester is a unit constituting the hard segment of the elastomer, and may be derived from aromatic dicarboxylic acids and aliphatic diols. For example, the polyester can include polyethylene terephthalate (PET), poly(1,3-propylene terephthalate) (PTT), polybutylene terephthalate (PBT), or a combination thereof or a copolymer thereof. In addition, the polyether is a unit constituting the soft segment of the elastomer, and can include, for example, polyethylene ether glycol (PEG), polypropylene ether glycol (PPG), polytetramethylene glycol (PTMG), polytetramethylene ether glycol (PTMEG), or a combination thereof or a copolymer thereof.

The polyester elastomer is a major component of the thermoplastic copolymer composition of the present invention, and can be included in an amount of 80 to 99% by weight, for example 90 to 98% by weight, based on a total weight of the polyester elastomer (a), the polytetramethylene glycol (b), and the additives (c).

The polyester elastomer can be included in an amount of 80 to 95% by weight, preferably 85 to 95% by weight, more preferably 85 to 90% by weight, based on the total weight of the thermoplastic copolymer composition. Within this range, physical property balance and hardness can be excellent.

Unless otherwise defined in the present description, the total weight of the thermoplastic copolymer composition refers to a sum of the weights of all components included in the thermoplastic copolymer composition.

The thermoplastic copolymer composition of the present invention can include the polytetramethylene glycol (PTMG) (b). Polytetramethylene glycol is a component that imparts soft properties to a molded article manufactured using a composition including a polyester elastomer, and serves to minimize noise generation due to mechanical friction in the molded article. Specifically, polytetramethylene glycol has excellent compatibility with a polyester elastomer, and thus can be evenly dispersed in a polyester elastomer resin. In this case, polytetramethylene glycol that has been evenly dispersed in the polyester elastomer resin can slowly leak to the surface of the molded article (resin) over time. Meanwhile, a constant velocity joint boot is mounted on the drive shaft of a vehicle to protect a constant velocity joint from the external environment and to prevent grease from being exposed to the outside while rotating. In the case of conventional constant velocity joint boots, during rotational motion, surface friction is continuously generated, leading to occurrence of surface damage. However, according to the present invention, the leaked polytetramethylene glycol can reduce surface friction of a polyester elastomer molded article, thereby preventing damage to a constant velocity joint boot and reducing noise generation.

Polytetramethylene glycol can be included in an amount of 3 to 8 parts by weight, specifically 3 to 5 parts by weight, based on 100 parts by weight of the polyester elastomer. That is, to reduce the surface friction of a molded article manufactured using the thermoplastic copolymer composition and apply the molded article to a constant velocity joint boot, polytetramethylene glycol needs to be included in an amount of 3 parts by weight or more. In this case, noise reduction properties (sound insulation properties) can be realized. In addition, to prevent deterioration in the mechanical properties of the molded article and deterioration in moldability due to excessive exudation, polytetramethylene glycol can be included in an amount of 8 parts by weight or less.

In one embodiment of the present invention, polytetramethylene glycol can have a weight average molecular weight (WAMW) of 2,000 to 5,000 g/mol, specifically 2,500 to 3,500 g/mol. Within this range, surface exudation rate can be easily controlled. Specifically, when molecular weight exceeds 2,000 g/mol, exudation rate is significantly increased, thereby preventing mold contamination and defects during molding. When molecular weight is 5,000 g/mol or less, significant decrease in the exudation rate of polytetramethylene glycol can be prevented. When the exudation rate is significantly decreased, polytetramethylene glycol does not leak sufficiently to the surface of a molded article, making it difficult to achieve the purpose of reducing surface friction.

Unless otherwise defined in the present description, weight average molecular weight can be measured by gel permeation chromatography (GPC, Waters Breeze). As a specific example, gel permeation chromatography (GPC, Waters Breeze) can be performed using an eluate preparing by mixing chloroform and chlorophenol in a volume ratio of 10:1 (chloroform:chlorophenol), and the measured value can be calculated as a relative value based on the value of a polystyrene standard (PS) sample.

In addition, in the thermoplastic copolymer composition of the present invention, the additives (c) including silica ($SiO_2$) and the siloxane-based polymer can increase the exudation rate of polytetramethylene glycol, thereby improving the ductility of a molded article manufactured using the thermoplastic copolymer composition. For example, when the molded article is applied to a constant velocity joint boot, noise reduction properties can be maximized.

More specifically, the siloxane-based polymer can be polydimethylsiloxane (PDMS) having a chemical structure represented by Chemical Formula 1 below.

[Chemical Formula 1]

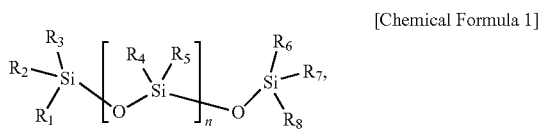

In Chemical Formula 1, $R_1$ to $R_8$ are each independently an alkyl group having 1 to 10 carbon atoms, and n is an integer from 100 to 10,000.

In Chemical Formula 1, $R_1$ to $R_8$ are preferably each independently an alkyl group having 1 to 5 carbon atoms, more preferably an alkyl group having 1 to 3 carbon atoms. In this case, noise reduction properties can be excellent.

In addition, in Chemical Formula 1, n is preferably an integer of 500 to 10,000, more preferably an integer of 1,000 to 10,000, still more preferably an integer of 5,000 to 10,000, most preferably an integer of 5,000 to 7,500. Within this range, noise reduction properties can be excellent.

When the siloxane-based polymer is included in a composition including a polyester elastomer, in a molded article manufactured using the composition, polytetramethylene glycol can leak evenly, and the exudation rate of polytetramethylene glycol can be increased. That is, to increase the exudation rate of polytetramethylene glycol, for example, a method of reducing the molecular weight of polytetramethylene glycol to be added can be used. However, in this case, as described above, workability-associated problems, such as mold contamination and defects, can occur during molding, and even exudation of polytetramethylene glycol in a molded article may not be realized. When the siloxane-based polymer having excellent compatibility with the polyester elastomer is added to the composition, in a molded article manufactured using the composition, even and rapid exudation of polytetramethylene glycol can be realized.

In addition, the additives (c) can further include silica ($SiO_2$).

For example, the silica can be fumed silica. The siloxane-based polymer included in the additives (c) exists as a liquid polymer at room temperature. Thus, in terms of storage, transport, and ease of introduction into a composition, preferably, the siloxane-based polymer and silica are prepared in a pellet form and are added to the composition. In this case, the siloxane-based polymer and silica can be evenly dispersed in the polyester elastomer composition. In addition, the fumed silica can include a high molecular weight chain structure. In this case, entanglement between several polymers in the composition can be induced, thereby improving the mechanical properties of the composition and a molded article manufactured using the composition.

The additives (c) including silica and the siloxane-based polymer that are capable of exerting the above-described function can be included in an amount of 1 to 4 parts by weight, specifically 1.5 to 3.0 parts by weight, based on 100 parts by weight of the polyester elastomer. To realize the intended effect of the additives, the content of the additives can be 1 part by weight or more. In particular, to prevent decrease in hardness and peeling, the content of the additives can be 4 parts by weight or less.

In one embodiment of the present invention, in the additives (c) including silica and the siloxane-based polymer, the siloxane-based polymer can be included in an amount of 1 to 4 parts by weight, specifically 1.5 to 3.0 parts by weight, based on 1 part by weight of silica. When the content of the siloxane-based polymer exceeds 1 part by weight based on 1 part by weight of silica, the exudation rate of polytetramethylene glycol can be increased. Meanwhile, to prevent degradation in durability due to decrease in hardness of a molded article, the siloxane-based polymer can be used in an amount of 4 parts by weight or less based on 1 part by weight of silica.

In addition, to improve the mechanical properties, such as hardness, of a molded article, the thermoplastic copolymer composition of the present invention can further include a polyalkylene terephthalate, e.g., polybutylene terephthalate (PBT). In the case of a molded article manufactured using a thermoplastic copolymer composition further including the polyalkylene terephthalate, decrease in hardness can be prevented, thereby improving durability. Thereby, mechanical damage to the surface of the molded article can be minimized. Thus, when the molded article is used as a constant velocity joint boot, noise reduction properties can be improved.

The content of the polyalkylene terephthalate can be 3 to 8 parts by weight, specifically 3 to 5 parts by weight, based on 100 parts by weight of the polyester elastomer.

When the polyalkylene terephthalate is used in an amount less than 3 parts by weight based on 100 parts by weight of the polyester elastomer, hardness enhancing effect can be insignificant. When the polyalkylene terephthalate is used in an amount exceeding 8 parts by weight, hardness is excessively increased, causing decrease in the elasticity of a molded article. As a result, noise reduction properties (sound insulation properties) can be degraded.

In addition, when necessary, the thermoplastic copolymer composition of the present invention can additionally include various additives such as a compatibilizer, an ionomer, a heat stabilizer, a light stabilizer, a lubricant, and a carbon black pigment.

The compatibilizer is a chain extending agent and serves to adjust the viscosity of a polymer composition. For example, the compatibilizer can include a glycidyl-modified ethylene-octene copolymer (EOR-GMA). The glycidyl-modified ethylene-octene copolymer can be an ethylene-octene copolymer graft-modified with glycidyl methacrylate. In this case, the graft content of glycidyl methacrylate is 8 to 20% by weight.

In addition, the ionomer serves to increase melt tension (improving product moldability) and chemical resistance and to reinforce abrasion resistance, and can include, for example, Surlyn 8920 (Dupont Co.), which is a sodium-based ionomer.

When the thermoplastic copolymer composition is mixed or molded at high temperature, the heat stabilizer serves to inhibit or block thermal decomposition of the composition. For example, the heat stabilizer can include amine-based, phenol-based, or phosphite-based heat stabilizers without being limited thereto.

As the light stabilizer, a UV absorber or a hindered amine light stabilizer (HALS) that inhibits decomposition due to UV exposure can be used. The UV absorber can include hydroxybenzophenone-based or benzotriazole-based UV absorbers without being limited thereto. In addition, the hindered amine light stabilizer can include a mixture of bis(1,2,2,6,6-pentamethyl-4-piperidyl)sebacate and methyl 1,2,2,6,6-pentamethyl-4-piperidyl sebacate without being limited thereto.

The lubricant can include amide-based, montan-based, and olefin-based monomeric wax.

Each of the various additives can be used within a content range that does not impair the inherent physical properties of the thermoplastic copolymer composition of the present invention, and can be used, for example, in an amount of 0.1 to 5% by weight or 0.1 to 3% by weight based on the total weight of the composition.

The thermoplastic copolymer composition of the present invention can be prepared by heating and melt mixing the above-described components, and can be pelletized. In this case, melt mixing temperature can be appropriately determined in consideration of the melting point of the polyester elastomer. For example, melt mixing can be performed at 200° C. to 300° C., specifically 200° C. to 270° C.

When melt index (g/10 min) is measured according to ISO1133(conditions of 230° C. and 10 kg), the melt index of the thermoplastic copolymer is preferably 18 g/10 min or less, more preferably 17 g/10 min or less, still more preferably 16 g/10 min or less. As a specific example, the melt index of the thermoplastic copolymer is 5 to 18 g/10 min, preferably 10 to 18 g/10 min, more preferably 12 to 18 g/10 min, still more preferably 14 to 17 g/10 min, most preferably 15 to 16 g/10 min. Within this range, injection moldability can be excellent.

When hardness (Shore D) is measured according to ISO868, the hardness of the thermoplastic copolymer is preferably 33 or more. As a specific example, the hardness of the thermoplastic copolymer is 33 to 40, preferably 33 to 38, more preferably 33 to 37. Within this range, hardness properties and physical property balance can be excellent.

When tensile strength (MPa) is measured according to ISO527, the tensile strength of the thermoplastic copolymer is preferably 15 MPa or more. As a specific example, the tensile strength of the thermoplastic copolymer is 15 to 25 MPa, preferably 15 to 20 MPa, more preferably 15 to 16 MPa. Within this range, strength and physical property balance can be excellent.

When tensile elongation (%) is measured according to ISO527, the tensile elongation of the thermoplastic copolymer is preferably 260% or more, more preferably 270% or more, still more preferably 277% or more. As a specific example, the tensile elongation of the thermoplastic copolymer is 260 to 290%, preferably 270 to 290%, more preferably 275 to 285%, still more preferably 275 to 280%. Within this range, mechanical properties and physical property balance can be excellent.

When the number of cycles at which a noise of 75 dB or more is generated is measured using a noise meter under the condition that the bending angle of a specimen is 40°, the number of cycles in the thermoplastic copolymer, at which a noise of 75 dB or more is generated, is preferably or more, more preferably 38 or more, still more preferably 41 or more, most preferably 42 or more. As a specific example, the number of cycles in the thermoplastic copolymer is 34 to 45. Within this range, a noise reduction effect and physical property balance can be excellent.

When coefficient of friction is measured while moving a ball tip with a weight of 10 kg on a 100×100×2 mm square specimen by 30 mm, the coefficient of friction of the thermoplastic copolymer is 0.05 or less, more preferably 0.045 or less, still more preferably 0.042 or less, most preferably 0.040 or less. Within this range, a noise reduction effect can be excellent.

When gloss is measured at a reflection angle of 60° after leaving for a week at room temperature after injection, the gloss of the thermoplastic copolymer is 5 or less, more preferably 3 or less, still more preferably 1 or less. Within this range, noise reduction properties can be excellent.

When, under the condition of a reflection angle of 60°, gloss measured after leaving for a week at room temperature after injection is compared with gloss measured immediately after injection, the thermoplastic copolymer preferably exhibits a gloss reduction rate of 70% or more, more preferably 80% or more, still more preferably 90% or more. Within this range, noise reduction properties can be excellent.

A molded article, such as a constant velocity joint boot, can be manufactured using the above-described thermoplastic copolymer composition of the present invention by extrusion molding. In this case, the molded article can have improved soft properties while maintaining mechanical properties, thereby reducing noise generation due to friction during rotation, contamination, or the like.

Therefore, the present invention additionally provides a molded article manufactured using the thermoplastic copolymer composition.

In addition, the number of cycles at which a noise of 75 dB or more was generated in the molded article was measured in the following manner.

Figure 2:
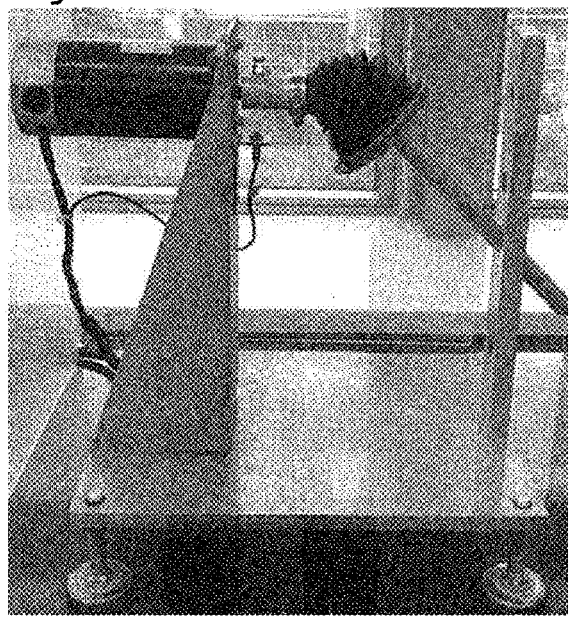
FIG. 2 shows a state in which a hollow molded article is mounted at a bending angle of 40° on a noise meter to measure the number of cycles at which a noise of 75 dB or more is generated.

(1) After mounting the molded article to a noise meter at a bending angle of 40°, rotation was performed at 150 rpm. The mounting state is shown in FIG. 2. At this time, the measurement was performed at room temperature under the condition that a noise of 75 dB or less was generated.

(2) 25 g of an aqueous solution containing 15% by weight of calcium chloride ($CaCl_2$) and 15% by weight of calcium hydroxide ($Ca(OH)_2$) was sprayed for 30 seconds.

(3) 10 g of sand having a particle diameter of 0.8 to 1.2 mm was sprinkled for 10 seconds.

(4) Idling was performed for 60 seconds.

(5) The processes (2) to (4) were repeated.

(6) Executing the above processes once corresponds to one cycle, and one cycle takes a total of 100 seconds.

When a noise of 75 dB or more occurred during any cycle, rotation was maintained, and when the noise lasted for 3 minutes or more, the cumulative number of such a cycle was considered as the number of cycles at which a noise of 75 dB or more was generated, and was recorded.

The present invention can include a constant velocity joint boot for automobiles, wherein the number of cycles at which a noise of 75 dB or more is generated is preferably 40 to 80 when measurement is performed in the above manner.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications can be made without departing from the spirit and scope of the present invention.

EXAMPLES 1 TO 4 AND COMPARATIVE EXAMPLES 1 TO 7

The components of the compositions shown in Table 1 below were melted and mixed at 230° C. using a twin-screw extruder and pelletized to prepare thermoplastic copolymer resin compositions. Here, the components of the compositions used in Examples and Comparative Examples are as follows.

First, the polyester elastomer was prepared by subjecting polybutylene terephthalate and polytetramethylene glycol to polycondensation. In this case, melt index was 20 g/10 min (230° C., 2.13 kg), and polytetramethylene glycol (PTMG) (K-PTG, BASF Co.) having a weight average molecular weight of 3,000 g/mol was used.

In addition, to prepare the additives (c), 2.34 parts by weight of polydimethylsiloxane (PDMS), as the siloxane-based polymer, having a chemical structure represented by Chemical Formula 1, wherein n is 6,000, and 1 part by weight of fumed silica (GENIOPLAST Pellets, Wacker Co.) were mixed into pellets and compounded.

KT-20 (Shenyang Ketong Plastic Co.) was used as the compatibilizer, and Surlyn 8920 (DuPont Co.) was used as the ionomer. In addition, a mixture prepared by mixing 0.5% by weight of Naugard 445 and 0.5% by weight of Songnox 1010 was used as the heat stabilizer, 0.2% by weight of Chimassorb 944 was used as the light stabilizer, and a mixture prepared by mixing 0.3% by weight of OP WAX and 0.3% by weight of LC104N was used as the lubricant. Carbon black EC300J was used as the carbon black pigment.

The prepared composition was subjected to vacuum drying at 85° C. for 4.5 hours, and then subjected to injection molding at 230° C. to prepare a 100 mm×100 mm×2T square disk specimen for measuring tensile strength, tensile elongation, hardness, and the like. A hollow molded article for measuring the number of cycles at which a noise of 75 dB or more was generated was prepared.

EXPERIMENTAL EXAMPLE 1

The physical properties of thermoplastic copolymer composition specimens manufactured in Examples 1 to 4 and Comparative Examples 1 to 7 were measured according to the following methods, and the results are shown in Tables 1 and 2 below.
1) Melt index (g/10 min): The melt index of the specimen was measured according to the ISO 1133 test standard (under the conditions of 230° C. and 10 kg).
2) Hardness (Shore D): The Shore D hardness of the specimen was measured according to the ISO 868 test standard.
3) Tensile strength (MPa) and tensile elongation (%): The tensile strength (MPa) and tensile elongation (%) of the specimen were measured according to the ISO 527-2-5A test standard.
4) Number of noise generation cycles: The number of cycles at which a noise of 75 dB or more was generated was measured for a molded article.

TABLE 1

| | | Examples | | | |
| --- | --- | --- | --- | --- | --- |
| Classification | | 1 | 2 | 3 | 4 |
| Composition (Unit: parts by weight) | Thermoplastic polyester elastomer (TPEE) | 100 | 100 | 100 | 100 |
| | Polytetramethylene glycol (PTMG) | 5 | 5 | 5 | 4 |
| | Additives (c) | 2 | 2 | 3 | 2 |
| | Polybutylene terephthalate (PBT) | — | 5 | 5 | 5 |
| | Compatibilizer | 1 | 1 | 1 | 1 |
| | Ionomer | 2 | 2 | 2 | 2 |
| | Heat stabilizer | 1 | 1 | 1 | 1 |
| | Light stabilizer | 0.2 | 0.2 | 0.2 | 0.2 |
| | Lubricant | 0.6 | 0.6 | 0.6 | 0.6 |
| | Carbon black pigment | 0.5 | 0.5 | 0.5 | 0.5 |
| Physical properties | Melt index (g/10 min) | 15 | 16 | 18 | 18 |
| | Hardness (Hs) | 33 | 37 | 34 | 38 |
| | Tensile strength (MPa) | 21 | 20 | 19 | 20 |
| | Tensile elongation (%) | 277 | 280 | 270 | 280 |
| | Number of noise generation cycles | 38 | 42 | 40 | 35 |

TABLE 2

| | | Comparative Examples | | | | | | |
| --- | --- | --- | --- | --- | --- | --- | --- | --- |
| Classification | | 1 | 2 | 3 | 4 | 5 | 6 | 7 |
| Composition (Unit: parts by weight) | Thermoplastic polyester elastomer (TPEE) | 100 | 100 | 100 | 100 | 100 | 100 | 100 |
| | Polytetramethylene glycol (PTMG) | — | 5 | 5 | 5 | 5 | 5 | 5 |
| | Additives (c) | — | — | — | — | — | 0.5 | 5 |
| | Polybutylene terephthalate (PBT) | — | — | 5 | 1 | 10 | 5 | 5 |
| | Compatibilizer | 1 | 1 | 1 | 1 | 1 | 1 | 1 |
| | Ionomer | 2 | 2 | 2 | 2 | 2 | 2 | 2 |
| | Heat stabilizer | 1 | 1 | 1 | 1 | 1 | 1 | 1 |
| | Light stabilizer | 0.2 | 0.2 | 0.2 | 0.2 | 0.2 | 0.2 | 0.2 |
| | Lubricant | 0.6 | 0.6 | 0.6 | 0.6 | 0.6 | 0.6 | 0.6 |
| | Carbon black pigment | 0.5 | 0.5 | 0.5 | 0.5 | 0.5 | 0.5 | 0.5 |
| Physical properties | Melt index (g/10 min) | 9 | 19 | 19 | 17 | 15 | 16 | 20 |
| | Hardness (Hs) | 37 | 34 | 40 | 33.5 | 38 | 37 | 32 |
| | Tensile strength (MPa) | 20 | 20 | 20 | 21 | 22 | 20 | 19 |
| | Tensile elongation (%) | 280 | 280 | 285 | 265 | 261 | 275 | 270 |
| | Number of noise generation cycles | 2 | 17 | 25 | 18 | 26 | 30 | 40 |

Referring to Tables 1 and 2, in the case of Examples 1 to 4 of the present invention related to a molded article manufactured using a thermoplastic copolymer composition including polytetramethylene glycol and additives including a siloxane-based polymer and silica, the number of noise generation cycles (number of cycles with noise lasting 3 minutes or more) was 35 to 42, showing excellent properties with regard to noise generation. That is, due to the presence of the additives including the siloxane-based polymer and silica, the exudation rate of polytetramethylene glycol was increased, which imparted ductility (slippery properties) to the surface of the molded article. As a result, the noise reduction properties of the molded article were improved. On the other hand, in the case of the molded article (Comparative Example 1) manufactured using a composition not including polytetramethylene glycol, noise lasted for 3 minutes or more in the second cycle, indicating that the molded article exhibited no noise reduction effect. In addition, in the case of the molded article (Comparative Example 2) manufactured using a composition including polytetramethylene glycol but no additives including the siloxane-based polymer and silica, the number of noise generation cycles was 17, showing insignificant noise reduction effect compared to the examples. These results suggested that the exudation rate of polytetramethylene glycol was further increased due to the presence of the additives including the siloxane-based polymer and silica, which effectively reduced the surface friction of the molded article.

Meanwhile, in the case of Examples 1 and 2 and Comparative Examples 3 to 5, when polybutylene terephthalate (PBT) was added in a certain amount, the number of noise generation cycles of the molded article was somewhat reduced, and the hardness properties of the molded article were improved. However, when an excess of PBT was added, hardness and melt index were negatively affected.

In the case of Comparative Example 6, when the additives including the siloxane-based polymer and silica were added in a small amount, e.g., 0.5 parts by weight, the noise reduction effect of a molded article was not properly exhibited compared to Example 2. In the case of Comparative Example 7 in which an excess of the additives including the siloxane-based polymer and silica was added, the noise reduction properties of a molded article were exhibited, but hardness properties were degraded. In particular, melt index was so high that the molded article flowed down during molding.

EXPERIMENTAL EXAMPLE 2

FIG. 1 shows the surface conditions of specimens manufactured according to Examples 1 and 2 and Comparative Examples 2 and 3, in which PTMG was used in the same amount in a thermoplastic copolymer composition, after leaving the specimens for 1 week.

As shown in FIG. 1, under the condition of using the same amount of PTMG, in the case of Example 1 in which the additives including silica and the siloxane-based polymer were added and in the case of Example 2 in which PBT was additionally added, no gloss was observed on the surfaces of the specimens. On the other hand, in the case of Comparative Examples 2 and 3 in which silica and the siloxane-based polymer were not added, gloss was observed on the surfaces of the specimens. These results indicate that silica and the siloxane-based polymer used in Examples 1 and 2 increased the exudation rate of PTMG to the extent that the surface gloss of the specimen disappeared. In addition, these results suggested that, when the phenomenon was applied to a molded article such as a constant velocity joint boot, noise reduction effect was achieved in a noise test.

EXPERIMENTAL EXAMPLE 3

The coefficient of friction and the gloss of thermoplastic copolymer composition specimens manufactured in Example 2 and Comparative Example 3 were measured using the following methods, and the results are shown in Table 3 below.
5) Coefficient of friction: The coefficient of friction was measured while moving a ball tip with a weight of 10 kg on a 100×100×2 mm square specimen by 30 mm.
6) Gloss: Gloss was measured at a reflection angle of 60° using a glossmeter (TC-108DPA, Tokyo Denshoku Co.).

TABLE 3

| Classification | | Example 2 | Comparative Example 3 |
|---|---|---|---|
| | Coefficient of friction | 0.035 | 0.064 |
| Gloss | Immediately after injection | 25 | 24.2 |
| | After leaving at room temperature for 1 week | 0.8 | 15 |
| | Reduction rate (%) | 96.8 | 38 |

Referring to Table 3, compared to Comparative Example 3 not including the additives, the thermoplastic copolymer composition (Example 2) including the additives according to the present invention had a very small coefficient of friction, indicating that friction noise resistance was excellent. In addition, compared to Comparative Example 3 not including the additives, the thermoplastic copolymer composition (Example 2) including the additives according to the present invention, there was no significant difference in gloss immediately after injection. However, when comparing gloss after leaving at room temperature for 1 week after injection, in Example 2, gloss was significantly reduced. On the other hand, in Comparative Example 3, gloss was not significantly reduced. These results indicate that the additives (c) used in Example 2 increased the exudation rate of PTMG to the extent that the surface gloss of the injected specimen disappeared. It can be seen that the surface exudation of PTMG in a constant velocity joint boot leads to noise reduction.

The invention claimed is:
1. A thermoplastic copolymer composition, comprising:
a polyester elastomer;
a polytetramethylene glycol; and
additives comprising silica and a siloxane-based polymer represented by Chemical Formula 1,
wherein the additives are comprised in an amount of 1 to 4 parts by weight based on 100 parts by weight of the polyester elastomer, and
wherein the polytetramethylene glycol is comprised in an amount of 3 to 8 parts by weight based on 100 parts by weight of the polyester elastomer:

[Chemical Formula 1]

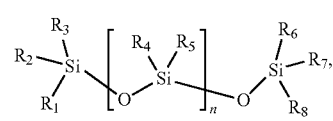

wherein $R_1$ to $R_8$ are each independently an alkyl group having 1 to 10 carbon atoms, and n is an integer from 100 to 10,000.

2. The thermoplastic copolymer composition according to claim 1, wherein the polyester elastomer is comprised in an amount of 80 to 95% by weight based on a total weight of the thermoplastic copolymer composition.

3. The thermoplastic copolymer composition according to claim 1, wherein, in the additives, the siloxane-based polymer represented by Chemical Formula 1 is comprised in an amount of 1 to 4 parts by weight based on 1 part by weight of the silica.

4. The thermoplastic copolymer composition according to claim 1, wherein the polytetramethylene glycol has a weight average molecular weight of 2,000 g/mol to 5,000 g/mol.

5. The thermoplastic copolymer composition according to claim 1, wherein the silica is fumed silica.

6. The thermoplastic copolymer composition according to claim 1, further comprising a polyalkylene terephthalate.

7. The thermoplastic copolymer composition according to claim 6, wherein the polyalkylene terephthalate is polybutylene terephthalate.

8. The thermoplastic copolymer composition according to claim 6, wherein the polyalkylene terephthalate is comprised in an amount of 3 to 8 parts by weight based on 100 parts by weight of the polyester elastomer.

9. The thermoplastic copolymer composition according to claim 1, wherein the polyester elastomer is a polycondensed product of a polyester and a polyether.

10. The thermoplastic copolymer composition according to claim 9, wherein the polyester is polyethylene terephthalate (PET), poly(1,3-propylene terephthalate) (PTT), polybutylene terephthalate (PBT), a combination thereof or a copolymer thereof.

11. The thermoplastic copolymer composition according to claim 9, wherein the polyether is polyethylene ether glycol (PEG), polypropylene ether glycol (PPG), polytetramethylene glycol (PTMG), polytetramethylene ether glycol (PTMEG), a combination thereof or a copolymer thereof.

12. The thermoplastic copolymer composition according to claim 1, wherein, the thermoplastic copolymer composition has a melt index of 18 g/10 min or less when measured under conditions of 230° C. and 10 kg according to ISO1133, and a number of cycles at which a noise of 75 dB or more is generated is 34 or more when measured using a noise meter under a condition that a bending angle of a specimen is 40°.

13. The thermoplastic copolymer composition according to claim 1, wherein the thermoplastic copolymer composition has a gloss reduction rate of 70% or more when a gloss measured under a condition of a reflection angle of 60° after leaving for a week at room temperature after injection molding of the thermoplastic composition is compared with a gloss measured under a condition of a reflection angle of 60° immediately after injection molding of the thermoplastic composition.

14. A molded article, comprising the thermoplastic copolymer composition of claim 1.

15. The molded article according to claim 14, wherein the molded article is a constant velocity joint boot.

* * * * *